United States Patent [19]

Clasen et al.

[11] Patent Number: 4,747,863

[45] Date of Patent: May 31, 1988

[54] METHOD OF MANUFACTURING GLASS BODIES

[75] Inventors: Rolf Clasen; Joachim F. A. Opitz, both of Aachen, Fed. Rep. of Germany

[73] Assignee: U. S. Philips Corp., New York, N.Y.

[21] Appl. No.: 864,988

[22] Filed: May 19, 1986

[30] Foreign Application Priority Data

Jun. 21, 1985 [DE] Fed. Rep. of Germany ....... 3522194

[51] Int. Cl.$^4$ ............................................ C03B 37/016
[52] U.S. Cl. ......................................... 65/17; 65/3.11; 65/18.4; 65/DIG. 900; 65/DIG. 901; 65/32; 156/DIG. 108; 264/56; 501/12
[58] Field of Search ...................... 65/2, 3.11, 3.12, 17, 65/18.1, 18.3, 18.4, 13, DIG. 900, DIG. 901; 156/DIG. 108; 501/12; 264/56

[56] References Cited

U.S. PATENT DOCUMENTS

| | | | |
|---|---|---|---|
| 4,417,910 | 11/1983 | Passaret | 65/3.12 |
| 4,419,115 | 12/1983 | Johnson et al. | 65/3.12 |
| 4,426,216 | 1/1984 | Satoh et al. | 65/17 |
| 4,574,063 | 3/1986 | Scherer | 65/18.1 X |

*Primary Examiner*—Robert L. Lindsay
*Attorney, Agent, or Firm*—Ernestine Bartlett

[57] ABSTRACT

A method of manufacturing glass bodies, in which the starting material for the glass body, being monodispersed $SiO_2$ particles (quartz-glass powder), is used to form an open-pore green body which is subjected to a purification process in which the impurities present in the green body react with a purifying gas which is heated to a temperature in the range from 600 to 900° C., after which the green body is sintered, in which a two-stage heating-purification step is used, such that in the first stage $SiO_2$ particles are heated until they are dense-sintered, i.e. they have no more micropores, and in the second stage the homogeneous open-pore green body formed from the dense-sintered $SiO_2$ particles is purified in a known manner in the purification gaseous atmosphere and subsequently sintered.

10 Claims, No Drawings

METHOD OF MANUFACTURING GLASS BODIES

BACKGROUND OF THE INVENTION

The invention relates to a method of manufacturing glass bodies, in which the starting material for the glass body, being monodispersed $SiO_2$ particles (quartz-glass powder), is used to form an open-pore green body which is subjected to a purification process in which the impurities present in the green body react with a purifying gas which is heated to a temperature in the range from 600° to 900° C., after which the green body is sintered.

The invention further relates to the use of the glass bodies manufactured by the method in accordance with the invention.

The method mentioned in the opening paragraph is particularly suitable for the manufacture of preforms for optical waveguides of quartz glass.

Optical waveguides have a wide range of application; they are used, for example, in short-distance light-transmission arrangements or long-distance light-transmission arrangements as used in optical communication systems, and they are predominantly made of a type of glass which has a high silicon-dioxide content (which, if required, contains a dopant for adjusting the refractive index of the glass).

The types of glass which are suitable for the manufacture of optical waveguides can also advantageously be used for the manufacture of lamp envelopes for halogen lamps or gas-discharge lamps, because these types of glass, like the ones used for optical waveguides, must be substantially anhydrous and contain a high silicon-dioxide content.

For the manufacture of preforms for optical waveguides, for example, microdispersed colloidal $SiO_2$ suspensions can be used which are formed into a green body. A method is known from, for example, the German patent application DE No. 3001792, in which through a sol-gel transformation a silicon alcoholate (or silicon alkoxide)/water/alcohol solution is hydrolized to form a gel in a vessel of a specific shape, after which the gel is slowly dried and sintered at a temperature below the melting temperature of the dry gel. By means of such a method, the desired shape can relatively easily be imparted to the green body, however, drying the gel so that a monolithic green body is obtained, which process must in any case be carried out so that no cracks are formed in the green body, presents considerable difficulties. The drying process must be carried out either extremely slowly, which is very time-consuming, or a large investment in equipment must be made (e.g. drying under hypercritical conditions in autoclaves). Purifying the dry green body in a heated gas atmosphere which reacts with the impurities present also presents difficulties due to the very large surface areas (typical size 1000 $m^2/g$) and, consequently, the very small spaces between the extremely fine particles. Moreover, upon sintering green bodies which are manufactured in this way, pin holes are often formed due to the adsorption of gas molecules at the surface and their subsequent occlusion upon sintering. A further disadvantage is that only green bodies can be formed which have a small relative green body density of $\approx 10\%$ of the density of compact quartz glass.

The British patent GB No. 682580 describes, for example, a centrifuging method of manufacturing porous glass tubes for use as, for example, filters for laboratory purposes, in which method glass-powder suspensions are introduced into a binding agent which precludes settling of the solid particles, and to which wetting agents and agents which present foaming of the suspension are added, the assembly being introduced into a centrifuge on the inner wall of which a loose-textured structure of deposited solid particles is formed.

In a centrifuging process for forming green bodies for the manufacture of quartz-glass bodies, the wide particle-size spectrum of the commercially available microdispersed $SiO_2$ particles is disadvantageous because of the very different settling rates of the individual particles and the consequent inhomogeneity of the green body obtained.

Quartz-glass powders as starting material for the manufacture of quartz-glass bodies, for example, optical waveguides, can, for example, also be processed in the form of extrusion material. The British patent GB No. 1010702 describes, for example, a method in which powdered, pure or substantially pure $SiO_2$ with a liquid binding agent, and, if necessary, a further lubricant which facilitates the extrusion process is processed to form an extrusion material and then deformed in an extrusion process.

Upon processing microdispersed starting powders having particle diameters $<1$ $\mu$m, as for the manufacture of quartz-glass bodies (in particular also for preforms of optical waveguides), problems arise with the mixing or kneading, particularly when the starting materials contain a high content of microdispersed phase, because in this case a considerably greater amount of particules must be uniformly distributed, and a correspondingly large surface must be uniformly covered with the additives (binding agents and lubricants). For example, the typical mixing and kneading times for a starting material of microdispersed quartz-glass particles (10–100 nm diameter) containing 60% by weight of $SiO_2$; 36% by weight of water and the remainder additives is approximately 1 to 3 hours.

Processing of powdered $SiO_2$ particles has certain advantages over the sol-gel method of manufacturing the starting material for quartz-glass bodies. A disadvantage of the commercially available $SiO_2$ powders is, however, that they are available only in highly dispersed form, i.e. in a wide range of particle sizes.

When monodispersed $SiO_2$ powders are used, the abovedescribed difficulties can be reduced. The manufacture of monodispersed quartz-glass powders is known (J. Colloid Interface Sci. 26 (1968), pages 62 to 69). This known synthesis of $SiO_2$ powders is based on the ammoniacal hydrolysis of alkoxysilanes dissolved in an alcoholic solution.

It has however been found that the spherical $SiO_2$ particles obtained in this known manner are themselves porous. Upon processing such porous $SiO_2$ particles the same difficulties present themselves as with, for example, $SiO_2$ starting material which were manufactured by the sol-gel method: it is very difficult to purify green bodies formed from porous $SiO_2$ particles in a heated gas atmosphere which reacts with the impurities present because of the very large specific surfaces of such green bodies (typical size 200–300 $m^2/g$). Moreover, upon sintering green bodies which are manufactured in this way, pin holes are often formed due to the absorption of gas molecules at the surface and their subsequent occlusion upon sintering.

BRIEF SUMMARY OF THE INVENTION

It is an object of the invention to provide a method of manufacturing very pure glass bodies, by means of which method a green body of such porosity is obtained that the said body can be thoroughly purified in one heating step in a gaseous atmosphere which reacts with the impurities present, which green body, moreover has such a high density that the subsequent sintering process can be carried out without any additional compacting operations, and which green body has a sufficiently great mechanical strength.

This object is achieved in accordance with the invention by a two-stage heating-purification step in which in the first stage monodispersed $SiO_2$ particles are heated until they are dense-sintered, i.e. they have no more micropores, and in the second stage the open-pore green body formed form the dense-sintered $SiO_2$ particles is purified in a known manner in the purification gaseous atmosphere and subsequently sintered.

In accordance with an advantageous modified embodiment of the method in accordance with the invention, the mono-dispersed $SiO_2$ particles are manufactured by an ammoniacalic hydrolysis of alkoxysilanes dissolved in an alcoholic solution. In this way, monodispersed starting powders for the manufacture of quartz-glass bodies can be obtained.

When the monodispersed $SiO_2$ powders obtained as described above are dense-sintered in a subsequent heating step at a temperature in the range from 600° to 800° C. in an inert atmosphere, preferably a vacuum or protective atmosphere (particularly a helium atmosphere), the advantage is obtained that the specific surface of the $SiO_2$ particles is substantially reduced. Consequently, such powders are, for example, better suited for use as extrusion materials because the binding agents and lubricants used only have to uniformly cover a substantially smaller particle surface. Further unlike with microdispersed powders, in centrifuging processes in which the $SiO_2$ particles manufactured in accordance with the invention are used, different deposition rates of particles having widely varying grain sizes do not occur, which different deposition rates lead to inhomogeneities in the centrifuged green body. The purification step which is carried out before the green body is sintered into a monolithic quartz-glass body also benefits from the use of the monodispersed $SiO_2$ powder manufactured in accordance with the invention, because on the smaller surface of the $SiO_2$ particle forming the porous green body now only a small amount of the chlorine gas used (among others) in the purification process is adsorbed, so that in the subsequent sintering step reboiling effects no longer occur.

A further advantage is that the water diffusion in the individual $SiO_2$ particles manufactured in accordance with a method of the invention is so insignificant that the OH concentration can be reduced to a few ppb. This is important for the subsequent use of the quartz-glass bodies manufactured from the $SiO_2$ powders: the types of glass used not only for optical waveguides, but also for lamp envelopes for halogen lamps or gas-discharge lamps, must be substantially anhydrous and have a high silicondioxide content.

A further advantage is that thanks to the reduced specific surface of the $SiO_2$ particles the purification process can also be carried out very efficiently in a heated purification gas which reacts with the impurities present in the green body; it has been found that also impurities in the form of transition metals present in quartz-glass moulding bodies which are manufactured by the method of the present invention, do not surpass the ppb range.

Dense-sintering the $SiO_2$ particles, i.e. substantially eliminating the fine pore-structure in the individual $SiO_2$ particles has the further advantage that a green body manufactured by means of this $SiO_2$ powder has a homogeneous pore volume, such that a quartz-glass body which is free from bubbles and reams can be obtained at lower sintering temperatures than would be necessary for sintering a green body having a very inhomogeneous pore volume into a qualitatively comparable quartz-glass body. Consequently, sintering ovens of a simpler construction can be used; in the case of sintering temperatures up to 1550° C., ovens having a SiC lining can be used, in the case of sintering temperatures over 1550° C., ovens having a lining which is resistant to very high temperatures, for example of $MoSi_2$, must be used; these ovens are more expensive than the ones lined with SiC. A further advantage of low sintering temperature is that recrystallization effects are avoided; as the sintering temperature rises, the recrystallization effects on the surface of the sintered body increase, which is particularly disturbing and undesired when the glass bodies are to be used as preforms for optical waveguides, because the mechanical properties strongly deteriorate (danger of cracking).

In accordance with the method of the present invention, monodispersed $SiO_2$ particles having an average diameter d of 0.08 to 0.9 $\mu$m and a standard deviation s of 0.04 to 0.1 $\mu$m (log normal distribution) can be obtained which are free of micropores and whose specific surface is from 3 to 30 $m^2/g$; in contrast to this, the specific surface of the porous $SiO_2$ particles prior to sintering was in the order of 270 $m^2/g$, and the pore volume was 0.16 ml with micropores having a diameter <3 nm.

DETAILED DESCRIPTION OF THE INVENTION

In the following a description is given of examples of methods for the manufacture of monodispersed $SiO_2$ particles and the manufacture of green bodies from these particles, which green bodies are subsequently sintered to form monolithic quartz-glass bodies which are free from bubbles and reams.

EXAMPLE I

In a conical flask, 41.7 ml of a 14.4 molar ammonia solution and 500 ml water (distilled) was mixed with 359 ml of absolute ethanol. Next, 100 ml of a 3.0 molar solution of distilled tetraethoxy silane in absolute ethanol was stirred into the mixture. After two minutes the reaction solution became turbid. In order to complete the reaction, the suspension obtained was stirred for a few more hours and then processed further. For this purpose, the suspension was concentrated considerably in a vacuum, neutralized by means of hydrochloric acid (pH$\approx$5) and centrifuged. In order to purify the deposited solid, it was dispersed again and centrifuged, after which it was dried in a drying cabinet at a temperature of 150° C. The yield is quantitative. Electron microscopic recordings showed that the powder particles obtained had a spherical shape and an average particle diameter d of 0.53 $\mu$m. The standard deviation s was 0.07 (log normal distribution). The specific surface was found to be 270 m$^2$/g and the pore volume 0.16 ml with micropores having a pore diameter of <3 nm.

In a centrifuging process a green body is manufactured as follows:

An amount of 200 g of SiO$_2$ particles having an average diameter d of 0.53 μm were mixed with 300 cm$^3$ of an aqueous 0.5% ammonia solution and dispersed by subjecting them to ultrasonics at a frequency f of 35 kHz for 10 minutes. This suspension was centrifuged in a large laboratory centrifuge at 10000 g for 15 minutes, the clear solution was decanted and the sediment was dried in 25 hours, in a manner such that a temperature of 120° C. was reached in 24 hours, to which temperature the sediment was subjected for 1 hour. Thus, a green bodie having a diameter of 25 mm and a density of 51% of the density of quartz glass was obtained. The green body thus formed was subsequently heated to ≈800° C. in a first process step causing the micropores of the individual SiO$_2$ particles to close. This green body was then purified in a second process step in an oven at a temperature of 900° C. for 2 hours, in which purification process the oven was flushed with an O$_2$ gas flow of $10^{-3}$ m$^3$/min (under normal conditions) and a Cl$_2$ gas flow of $6.10^{-5}$ m$^3$/min (under normal conditions). The green body thus purified was subsequently sintered at a temperature of 1500° C. in a helium atmosphere to which 2% by volume of chlorine gas was added, the green body being led through the oven at a speed of 3 mm/min. A transparent glass rod was obtained which was free from bubbles and reams, which had a diameter of 20 mm and which contained <10 ppb of impurities (transition metals and water) through the entire cross-section. The quartz-glass body obtained had a density of 2.2 g/cm$^3$ and a refractive index n$_D$ of 1.4590.

EXAMPLE II

In a glass reaction vessel 176.6 ml of a 14.4 molar ammonia solution was mixed with 3369 g of distilled water and 4664 ml of denatured ethanol. The denatured ethanol contained 0.1% of water and 4% of acetone. Next, 1500 ml of a 3.0 molar solution of distilled tetraethoxy silane in absolute ethanol were stirred into the said mixture, the concentration of the reaction components being 0.45 mol/l of tetraethoxy silane, 0.24 mol/l of ammonia and 21.0 mol/l of water. After deactivating the stirring arrangement the reaction solution started to become turbid after about 3 minutes. To complete the transformation of the reaction components, the suspension obtained was allowed to stand for several hours after which it was concentrated in a vacuum to about one fifth of its original volume. The concentrated suspension thus obtained was cryotransferred and dried in a freeze-drier after which the loose powder obtained was subjected to a final drying step in a vacuum at 1500° C. The yield was quantitative. The average particle diameter d, established by means of electron-microscopic recordings, is 0.29 μm. The standard deviation of the log normal distribution s was 0.08. The specific surface was ascertained to be 282 m$^2$/g and the pore volume to be 0.18 ml (micropores).

In a glass vessel which is positioned in an ultrasonic bath, 200 g of the still microporous powder manufactured as described above was mixed with 125 g of twice distilled water and 1.6 g of ammonium fluoride as an ionogenic additive, until a homogeneous suspension was obtained. This is readily attained in approximately 5-10 minutes without dilatation as is often seen with microdispersed, commercially available pyrogenic silicic acids having a wide grain size distribution.

The resultant suspension was poured into a tube of a polyethylene-terephthalate foil having a diameter of 24 mm which is then sealed in a gastight manner. After several hours at a temperature of from 30° to 40° C. the suspension has cross-linked so far that the test piece could be handled without deforming it. In order to enable the test piece to dry, the tube was dissolved by means of hot, liquid phenol. Subsequently, the test piece was slowly dried in a week's time.

During drying the test piece shrunk about 3%. The green body density of the dried test piece was 52% of the density of compact quartz glass.

In the next step the test piece was heated in a vacuum to a temperature of 800° C. in 4 hours, at which temperature it was purified (an oxygen flow of 1 l/min under normal conditions) for 2 hours in an oxygen atmosphere containing 10% by volume of chlorine gas.

The thus purified test piece was sintered in a helium atmosphere to which 2% by volume of chlorine gas was added at a temperature of 1500° C., the test piece being led through the sintering oven at a speed of 10 mm/min.

Thus, a transparent quartz-glass rod was obtained which was free from bubbles and reams and which had a diameter of 18.8 mm. The contamination by transition metals and water amounted to less than 10 ppb through the entire cross-section. The quartz-glass body obtained had a density of 2.2 g/cm$^3$ and a refractive index n$_D$ of 1.4590.

In the heating process for dense-sintering the individual SiO$_2$ particles only the pores of these particles are dense-sintered, consequently, it is alternatively possible to subject the porous monodispersed SiO$_2$ particles to this heating process prior to the moulding process for forming a green body, and to subsequently work up the non-porous SiO$_2$ particles thus obtained to form homogeneous green bodies by means of a suitable moulding process.

For the manufacture of a green body, using monodispersed, dense-sintered SiO$_2$ particles, a centrifuging process and a pouring process were described; however, in the manufacture of green bodies the same result can be obtained with any suitable moulding method in which a powdered SiO$_2$ starting material is used.

What is claimed is:

1. A method of manufacturing glass bodies, in which the starting material for the glass body, being microporous monodispersed suspensions of SiO$_2$ particles is used to form an open-pore green body which is subjected to a purification process in which the impurities present in the green body react with purifying gas which is heated to a temperature in the range from 600° to 900° C., after which the green body is sintered, characterized by a two-stage heating-purification step in which in the first stage the SiO$_2$ particles are heated until they are dense-sintered whereby they are substantially free of micropores, in which said particles have an average diameter of 0.08–0.9 μm, a standard deviation of about 0.04–0.1 μm and a specific surface of about 3 to 30 m2/g and in the second stage the open-pore green body formed from the dense-sintered SiO$_2$ particles is purified in a a gaseous purification atmosphere and subsequently sintered.

2. A method as claimed in claim 1, characterized in that monodispersed SiO$_2$ particles are manufactured by an ammoniacalic hydrolysis of alkoxysilanes dissolved in an alcohol.

3. A method as claimed in claim 2, characterized in that the ammoniacalic hydrolysis of the alkoxysilane is carried out in a solution in which the concentrations in the solution are as follows:
Alkoxysilane: 0.01 to 0.6 Mol/l
Ammonia: 0.2 to 8.0 Mol/l
Water: 1 to 21 Mol/l.

4. A method as claimed in claim 1, characterized in that for dense-sintering the $SiO_2$ particles, the said particles are heated to a temperature in the range from 600° to 800° C. in an inert atmosphere.

5. A method as claimed in claim 4, characterized in that the $SiO_2$ particles are heated in a vacuum.

6. A method as claimed in claim 4, characterized in that the $SiO_2$ particles are heated in, a helium atmosphere.

7. A method as claimed in claim 1, characterized in that for the second process step a flowing gas mixture of $O_2$ to which from 0.1 to 20% by volume of $Cl_2$ is added is used as a purification gas.

8. A method as claimed in claim 1, characterized in that after their synthesis the $SiO_2$ particles are subjected to a heating process after which the dense-sintered $SiO_2$ particles are formed into an open-pore green body.

9. A method as claimed in claim 1, characterized in that a green body is formed from the $SiO_2$ particles, which is subjected to a heating step for dense-sintering the individual $SiO_2$ particles.

10. A method as claimed in claim 1, characterized in that the process for purifying the green body is carried out at a temperature of about 900° C. for 2 hours in a flowing gas mixture of $10^{-3}$ $m^3$/min of $O_2$ and $6.10^{-5}$ $m^3$/min of $Cl_2$.

* * * * *